US012801836B2

(12) United States Patent
Gopa et al.

(10) Patent No.: US 12,801,836 B2
(45) Date of Patent: Nov. 17, 2026

(54) ADAPTIVE MULTI-LAYER ELECTRONIC CONTENT MANAGEMENT

(71) Applicant: WELLS FARGO BANK, N.A., San Francisco, CA (US)

(72) Inventors: Sunil K. Gopa, Bangalore (IN); Sadie S. Salim, Mill Valley, CA (US); Dennis E. Montenegro, Concord, CA (US); Akhlaq M. Khan, Mill Valley, CA (US); Amlan Patnaik, Concord, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 251 days.

(21) Appl. No.: 18/618,480

(22) Filed: Mar. 27, 2024

(65) Prior Publication Data

US 2025/0307529 A1 Oct. 2, 2025

(51) Int. Cl.
*G06F 40/166* (2020.01)
*G06F 40/103* (2020.01)

(52) U.S. Cl.
CPC .......... *G06F 40/166* (2020.01); *G06F 40/103* (2020.01)

(58) Field of Classification Search
CPC ............................. G06F 40/166; G06F 40/103
See application file for complete search history.

(56) References Cited

U.S. PATENT DOCUMENTS

| | | | | |
|---|---|---|---|---|
| 11,036,523 | B2 | 6/2021 | Almecija et al. | |
| 11,161,044 | B2 | 11/2021 | Aghdaie et al. | |
| 2018/0365025 | A1* | 12/2018 | Almecija | G06F 3/0482 |
| 2025/0272480 | A1* | 8/2025 | Malviya | G06F 40/174 |

FOREIGN PATENT DOCUMENTS

| | | | |
|---|---|---|---|
| CN | 106445321 | A | 2/2017 |
| CN | 112613283 | B | 7/2021 |

* cited by examiner

*Primary Examiner* — Andrey Belousov
(74) *Attorney, Agent, or Firm* — Kilpatrick Townsend & Stockton LLP

(57) ABSTRACT

Adaptive multi-layer electronic content management is provided. A system includes a processor coupled to a memory that that includes instructions that, when executed by the processor, cause the processor to receive an electronic document. The processor can determine an interaction event for at least one section of the electronic document. The processor can also determine an expertise level of a user of the electronic document based on the interaction event. The processor can assign a rule to the at least one section based on the interaction event and the expertise level of the user and implement an action to the at least one section of the electronic document based on a determination that the interaction event has occurred and the rule.

18 Claims, 6 Drawing Sheets

ADAPTIVE MULTI-LAYER ELECTRONIC CONTENT MANAGEMENT

TECHNICAL FIELD

Embodiments of the present disclosure generally relate to natural language processing, and more particularly to the usage of large language models for adaptive multi-layer electronic content management.

BACKGROUND

Customers seeking to obtain a loan, a mortgage, or execute some other type of transactional agreement must electronically submit numerous documents followed by an extensive review and execution period. Throughout this process of reviewing and executing the documents, different parts of the documents may become relevant under different circumstances and at different times. Additionally, once the process has started, there often arises a need to include additional documents and disclosures in addition to the original documents. Furthermore, many documents corresponding to transactional agreements use extensive legal terminology and are riddled with fine print information which presents a challenge for a lay person to understand. Moreover, it is possible that the people interacting with the document speak a language different than the language presented in the documents.

Despite the progress made in natural language processing, there remains a need in the art for improved methods and systems related to the usage of large language models for adaptive multi-layer electronic content management.

SUMMARY

Certain aspects and features of the present disclosure describe systems and methods that utilize large language models (LLMs) for adaptive multi-layer electronic content management. For example, a system for adaptive multi-layer electronic content management is provided. The system includes a processor coupled to a memory that stores instructions that, when executed by the processor, cause the processor to receive an electronic document. The processor can determine an interaction event for at least one section of the electronic document. The processor can also determine an expertise level of a user of the electronic document based on the interaction event. The processor can assign a rule to the at least one section based on the interaction event and the expertise level of the user and implement an action to the at least one section of the electronic document based on a determination that the interaction event has occurred and the rule. In some examples, the interaction event can include a at least one of a text input or a voice input from the user of the system. In some other examples a machine learning model trained on a library of previous interaction events can determine the expertise level of the user based on the interaction event.

According to another example, a system for adaptive multi-layer electronic content management is provided. The system includes a processor coupled to a memory that stores instructions that, when executed by the processor, cause the processor to receive an electronic document. The processor can determine an interaction event for at least one section of the electronic document. The processor can also determine an expertise level of a user of the electronic document based on the interaction event. The processor can assign a rule to the at least one section based on the interaction event and the expertise level of the user and implement an action to the at least one section of the electronic document based on a determination that the interaction event has occurred and the rule. The instructions can further cause the processor to organize the electronic document into a plurality of layers including a base content layer that contains the electronic document and a first layer that contains information corresponding to the base content layer. The information contained in the first layer can be generated by a machine learning model configured to provide a summary or explanation of the base content layer. In some examples, the plurality of layers includes a second layer that contains information corresponding to the first layer, where the information contained in the second layer is generated by the machine learning model. In some examples, the instructions can further cause the processor to identify at least one layer of the plurality of layers, where the identified layer corresponds to the expertise level of the user. The processor can also display the identified layer to the user.

According to another example, the action to be taken by the processor on the at least one section of the electronic document can include providing a summary of the least one section of the electronic document. The summary can correspond to the expertise level of the user. In some examples, a machine learning model, such as an LLM, trained on a library of textual information can summarize the at least one section of the electronic document. Additionally or alternatively, the LLM can provide multiple summaries of the electronic document stored in individual layers of the electronic document where the multiple summaries vary in terms of complexity. In these examples, each summary provided by the LLM can correspond to the expertise level of the user.

According to yet another example, a system for adaptive multi-layer electronic content management is provided. The system includes a processor coupled to a memory that stores instructions that, when executed by the processor, cause the processor to receive an electronic document. The processor can determine an interaction event for at least one section of the electronic document. The processor can also determine an expertise level of a user of the electronic document based on the interaction event. The processor can assign a rule to the at least one section based on the interaction event and the expertise level of the user and implement an action to the at least one section of the electronic document based on a determination that the interaction event has occurred and the rule. The memory can store additional instructions that further cause the processor to generate a second electronic document based on the interaction event. In some examples, the second electronic document can be generated by a machine learning model. In these examples, the machine learning model can be an LLM trained on a library of textual information and configured to predict a need for the second document based on the interaction event.

Other examples include methods and computer programs recorded on one or more computer storage devices, where the methods and computer programs are each configured to perform the actions described above.

Numerous benefits are achieved by way of the various embodiments over conventional techniques. For examples, embodiments described herein provide for systems and methods utilizing an LLM to provide adaptive multi-layer electronic content management. The systems and methods described herein provide a container that stores all the layers formed by the LLM and corresponding to the electronic document. All the layers operate and are stored within the container which keeps them organized, connected, and persistent across multiple sessions. The systems and methods can utilize a pointer to identify and surface the appropriate layer of the electronic document stored in the container based on the received input (e.g., interaction event) and the expertise level of the user. As such, the pointer can be considered a technical component that identifies and surfaces the layer that the LLM infers as the best layer to show to the user at the particular point in time. Users can interact with the system via the container and the pointer across various existing touch points, such as text based chatbot and voice assistance.

This summary is not intended to identify the key or essential features of the claimed subject matter, nor is it intended to be used in isolation to determine the scope of the claimed subject matter. Rather, the summary is merely a simplified and non-limiting summary of the innovation that is intended to provide a basic understanding of some aspects of the innovation. The subject matter should be understood by reference to appropriate portions of the entire specification of this disclosure, any or all drawings, and each claim.

To the accomplishment of the foregoing and related ends, certain illustrative aspects of the innovation are described herein in connection with the following description and the annexed drawings. These aspects are indicative, however, of but a few of the various ways in which the principles of the innovation may be employed and the subject innovation is intended to include all such aspects and their equivalents. Other advantages and novel features of the innovation will become apparent from the following detailed description of the innovation when considered in conjunction with the drawings.

BRIEF DESCRIPTION OF THE DRAWINGS

Various non-limiting embodiments are further described with reference to the accompanying drawings, in which.

DETAILED DESCRIPTION

Figure 1:
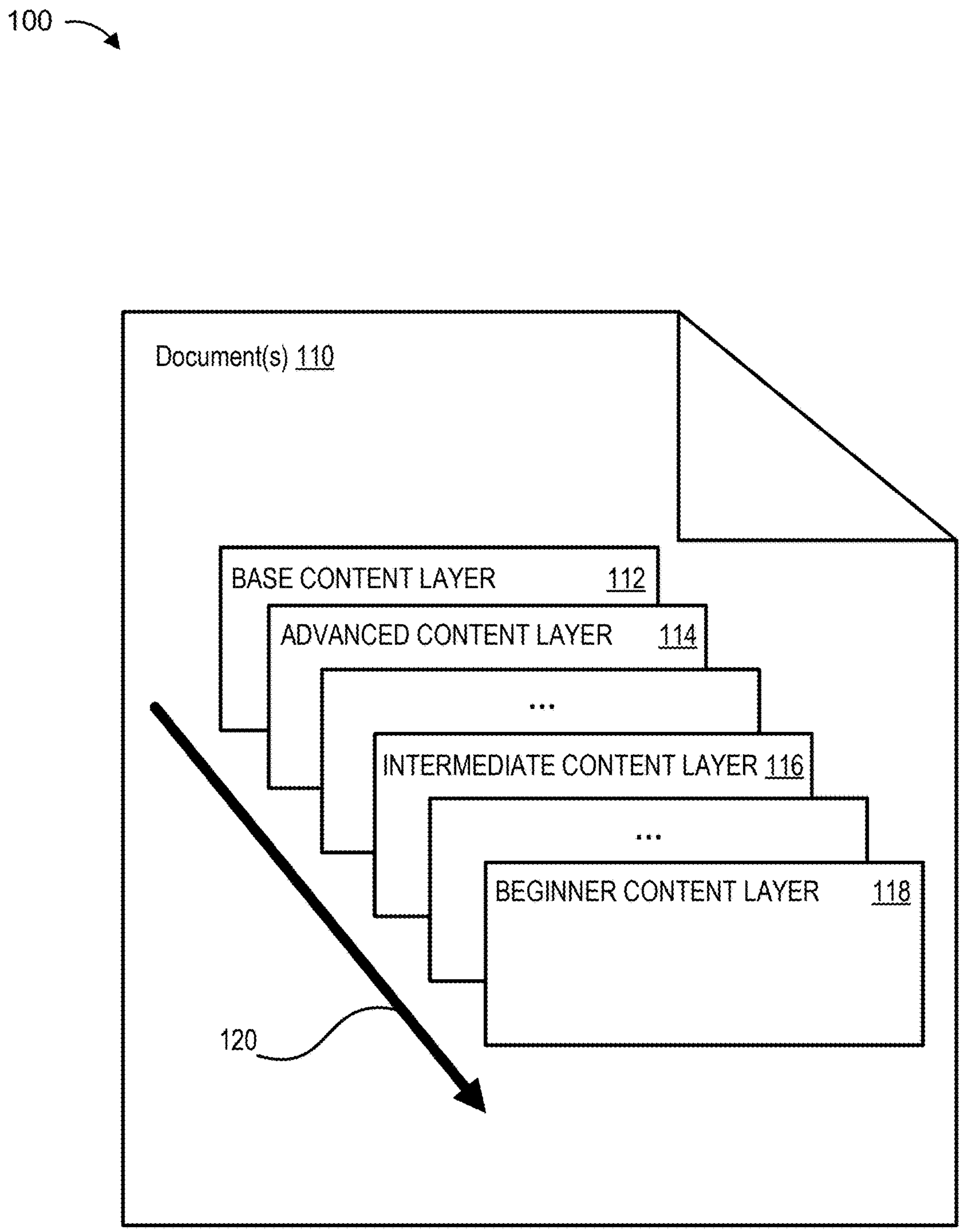
FIG. 1 illustrates an example of document layers, according to some aspects of the present disclosure.

In the following description, for the purposes of explanation, specific details are set forth in order to provide a thorough understanding of certain embodiments. However, it will be apparent that various embodiments may be practiced without these specific details. The figures and description are not intended to be restrictive. The words "exemplary" or "example" are used herein to mean "serving as an example, instance, or illustration." Any embodiment or design described herein as "exemplary" or "example" is not necessarily to be construed as preferred or advantageous over other embodiments or designs.

Additionally, although the term "document" is utilized for purposes of simplicity, the term "document" may refer to any type of electronic media content that can be utilized in electronic format and/or in print format. Likewise, the term "electronic media content" as used herein can refer to any form of data such as text data, image data, or video data. Although the various aspects are discussed with respect to a single document, the various aspects can be utilized with a specific portion or section of a document, more than one document, or a set of documents.

Furthermore, the term "document" may refer a certain type of document. Documents discussed herein may be of a same type or they may be of different types. For example, a first document in a set of documents may be a word processing document, a second document may be a spreadsheet document, a third document may be a slide show presentation, and so on. In another example, two or more documents may be word processing documents, another two or more documents may be spreadsheet documents, two or more documents may be slide show presentations, and so on.

Moreover, the examples described herein may be applied to any subject matter contained within the document. In other words, examples described herein can be applied to a document associated with a loan agreement, a mortgage agreement, an employment agreement, the bylaws associated with an enterprise, a lease agreement, a will, and so on.

Examples of the present disclosure generally relate to natural language processing, and more particularly to the usage of large language models for adaptive multi-layer electronic content management. Various aspects described herein relate to utilizing large language models to organize an electronic document into multiple layers. The document and the multiple layers formed from the document can be stored in a container and a pointer can be used to identify and surface a particular layer for a user based on a received input (e.g., interaction event). The provided adaptive multi-layer electronic content management can be adaptive in that a machine learning model, such as an LLM, can adaptively respond to the received input and point a user to the appropriate layer of the electronic documents based on the user's expertise level and the input query received from the user. In this way, the LLM can tailor the output based on the received input and the expertise level of the user to provide adaptive multi-layer electronic content management to dynamically move a user to different layers of a document at different points of time. In this manner, the adaptive multi-layer electronic content management can orchestrate a sequence and timing of document interaction across users, while maintaining a container that holds all the layers together, maintains context across multiple sessions, and surfaces the layer that is most pertinent at a particular moment.

According to one example, systems and methods can provide an adaptive multi-layer approach to organize the information contained within the electronic documents. In this example, the adaptive multi-layer electronic content management can receive a document and store it in a container. The stored, unaltered document can be stored in a conceptual base content layer of the adaptive multi-layer electronic content management. The base content layer can represent the document in its raw and unaltered form. A machine learning model, such as an LLM, can then organize the document into multiple layers conceptually formed above or on top of the base content layer. The LLM can generate multiple layers such that the multiple layers vary in terms of complexity. As more layers are formed above or on top of the base content layer, the level of complexity of the content generated at each layer can be progressively simplified. In other words, as the number of layers increase, the level of sophistication of the content contained within each layer is progressively simplified.

Continuing with the above example, the adaptive multi-layer electronic content management can be adaptive. Using a pointer, the adaptive multi-layer electronic content management can point to and surface the appropriate layer of the document and display it to a user corresponding to the user's expertise level. Thus, the adaptive multi-layer electronic content management can move a user to different layers of a document or set of documents at different points of time thereby orchestrating the sequence and timing across multiple users while simultaneously maintaining a container that holds all the layers together, maintains context across multiple sessions, and surfaces the layer that is most pertinent at a particular moment.

The adaptive multi-layer electronic content management can also generate layers based on specific contexts or use case scenarios. According to one particular example, the adaptive multi-layer electronic content management can analyze the document and generate multiple layers corresponding to information within the document dealing with the shortest and most important information to the longest and least important information. In this case, the systems and methods could receive the document, such as a lease agreement, and store it in a container. Then a machine learning model, such as an LLM, could analyze the lease agreement and generate multiple layers conceptually formed on top or above the base content layer corresponding to the shortest and most important information to the longest and least important information. For example, the conceptually formed highest layer generated by the LLM can include the lease start and end date and the amount of rent due each pay period (e.g., the shortest and most important information). The conceptually formed lowest layer, conceptually generated just above and on top of the base content layer, can include boilerplate legalese information (e.g., the longest and least important information). Additional layers can also be conceptually formed in between.

As previously mentioned, the adaptive multi-layer electronic content management can also be adaptive. As such, a user may interact with the adaptive multi-layer electronic content management and provide an input to the system. In some examples, the input received can be considered an interaction event. The interaction event could be a voice input query or a text input query. For example, the user could verbally instruct the adaptive multi-layer electronic content management to display the shortest and most important information from the electronic lease documents. Upon receipt of this instruction, the adaptive multi-layer electronic content management can access the lease document stored within the container and the pointer could point to and surface the layer corresponding to rental period and amount of rent due for each pay period.

According to another particular example, the adaptive multi-layer electronic content management can generate layers based on a determined expertise level of a user. The adaptive multi-layer electronic content management can determine the expertise level of the user based on the interaction event and then point the user to the appropriate layer based on the interaction event and the expertise level. Continuing on with the lease agreement example from above, the base content layer can include the raw, unaltered lease document. Then, a machine learning model, such as an LLM, can generate multiple layers formed conceptually above or on top of the base content layer and also stored within the container. Each additional layer conceptually formed above or on top of the base content layer provides a progressively simplified version and explanation of the base content layer.

Based on a user interaction with the system, the adaptive multi-layer electronic content management can determine an expertise level of the user. In some examples, the system may use a machine learning model, such as an LLM, that is specifically trained on previous interaction events to determine the expertise level of the user. In some examples, the LLM could analyze the interaction event received from the user and perform an analysis of the terminology used, the grammar, the sentence structure, or the complexity of the inquiry. In other examples, the user could manually input their expertise level. In either case, the adaptive multi-layer electronic content management could, via the pointer, identify and surface (e.g., display) the appropriate layer to the user based on the determined expertise level.

In some examples, the expertise level may correspond to an education level of the user. For example, the multiple layers conceptually formed above the base content layer can be progressively simplified for postgraduate, college, high school, and grade school education level audiences.

In other examples, the expertise level may correspond to a user's prior experience and knowledge with the particular type of document. For example, a lawyer whose legal practice involves drafting lease agreements may be considered by the system to be an expert. As a result, the pointer can identify and surface (e.g., display) the most complex layer or the base content layer of the lease document for the lawyer's review.

In yet other examples, the expertise level can correspond to the user's role and relationship to the document. For example, the document can be layered based on a child or grandchild acting as a translator and explainer for a grandparent who speaks a different language than the language represented in the document. In this case, the adaptive multi-layer electronic content management can render its output based on the role of the user. As such, the adaptive multi-layer electronic content management may identify and surface a content layer that instructs the child or grandchild how to explain the concept to the parent or grandparent. The machine learning model of the adaptive multi-layer electronic content management, such as an LLM can also generate anticipated questions and answers to accompany the talking points.

Additional examples of the adaptive multi-layer electronic content management generating layers based on specific contexts or use case scenarios include organizing the multiple layers based on timelines (e.g., the conceptual lowest layer could correspond to "whenever you can get to it" and the conceptual highest layer can correspond to "urgent and Immediate"). One of ordinary skill in the art will recognize many suitable alternatives.

According to another example, the adaptive multi-layer electronic content management can generate layers using image and video data where the layers vary in complexity from simple visuals to complicated and detailed visuals. The image and video data may be embedded into each layer of the document and each layer may be displayed via a web browser using HyperText Markup Language (HTML). Similar to above, the base content layer can include the raw, unaltered document. Then, each layer conceptually formed above and on top of the base content layer can include image and video data ranging from complicated and detailed image and video data in the layer conceptually formed directly above and on top of the base content layer to simple image and video data conceptually formed in the higher layers. In some examples, the layers can include any combination of text data, image data, or video data. The adaptive multi-layer electronic content management could, via the pointer, identify and surface (e.g., display) the appropriate layer to the user based on the determined expertise level.

According to another example, the adaptive multi-layer electronic content management can predictively generate additional documents based on a determination of the needs of the user. For example, the needs of the user can be determined based on the progression of user questions and inputs (e.g., progression of interaction events). In some examples, the additional documents can be generated by a machine learning model, such as an LLM. The LLM can be trained on a large corpus of text data, as discussed herein, and specifically tailored to analyze interaction events to predict whether a user may need a document in the future.

As a particular example illustrating the generation of additional documents, a lease document is once again provided. Throughout the course of a user interacting with the system, the user asks multiple questions about how to break the lease agreement, the penalties for breaking the lease agreement, and/or the timeline and process for breaking the lease agreement. As previously mentioned, through these interaction events, the adaptive multi-layer electronic content management can continuously adapt to the inquiries and point the user to the appropriate layers of the document based on the user's expertise level. Additionally, a machine learning model, such as an LLM, can predict, based on the sequence of interaction events, that the user is likely going to break the lease agreement. As a result, the machine learning model can generate additional documents, such as a letter of intent to break the lease agreement, that the user can use to notify the landlord of their intent.

While certain embodiments are described, these embodiments are presented by way of example only and are not intended to limit the scope of protection. The apparatuses, methods, and systems described herein may be embodied in a variety of other forms. Furthermore, various omissions, substitutions, and changes in the form of the example methods and systems described herein may be made without departing from the scope of protection. Further details regarding the systems and methods for utilizing LLMs to provide for adaptive multi-layer electronic content management are provided below in relation to the drawings.

Turning now to the drawings, FIG. 1 illustrates an example 100 of document layers, according to some aspects of the present disclosure. As previously, discussed, document 110 may be any type of document that is capable of being produced in electronic format and may be reduced to printed format as desired. Additionally, document 110 may be any file type of document such as a word processing document, a spreadsheet document, a slide show document, or any combination thereof. The document 110 may also include any of text data, image data, or video data. The document 110 may also be a smart document that is self-aware and may act upon sections of the document based on various situations discussed herein. As utilized herein "self-aware" indicates that the document has knowledge of its content and data, including the content and data retained in all layers of the document. The smart document may execute a set of services in order to perform actions that may be needed to comply with the rules or actions generated in response to on one or more interaction events discussed in more detail below. The smart document can also be self-contained, self-managed, and include self-healing aspects. As utilized herein "self-contained" refers to a container that holds the document or set of documents corresponding to a particular transaction. The particular transaction can correspond to a loan agreement, a mortgage agreement, an employment agreement, the bylaws associated with an enterprise, a lease agreement, a will, or any other type of transactional context requiring the use of documents.

As illustrated by FIG. 1, document 110 can include a base content layer 112. Base content layer 112 can include the unaltered, raw data of the document 110. Document 110 also includes multiple layers conceptually formed above or on top of base content layer 112. These layers include advanced content layer 114, intermediate content layer 116, beginner content 118, and additional layers formed between the various layers as illustrated by FIG. 1.

Example 100 of FIG. 1 also includes progression arrow 120. Progression arrow 120 corresponds to the progression of layers conceptually formed above or on top of base content layer 112. Progression arrow 120 may represent the information described in document 110 getting progressively simplified as layers are conceptually formed above and on top of the base content layer 112. Additionally, it will be appreciated that while the layers are drawn above or on top of base content layer 112, this is done for illustrative purposes to highlight one or more aspects of the present disclosure. It will be appreciated that the layers are stored as data within the container that holds document 110.

Figure 2:
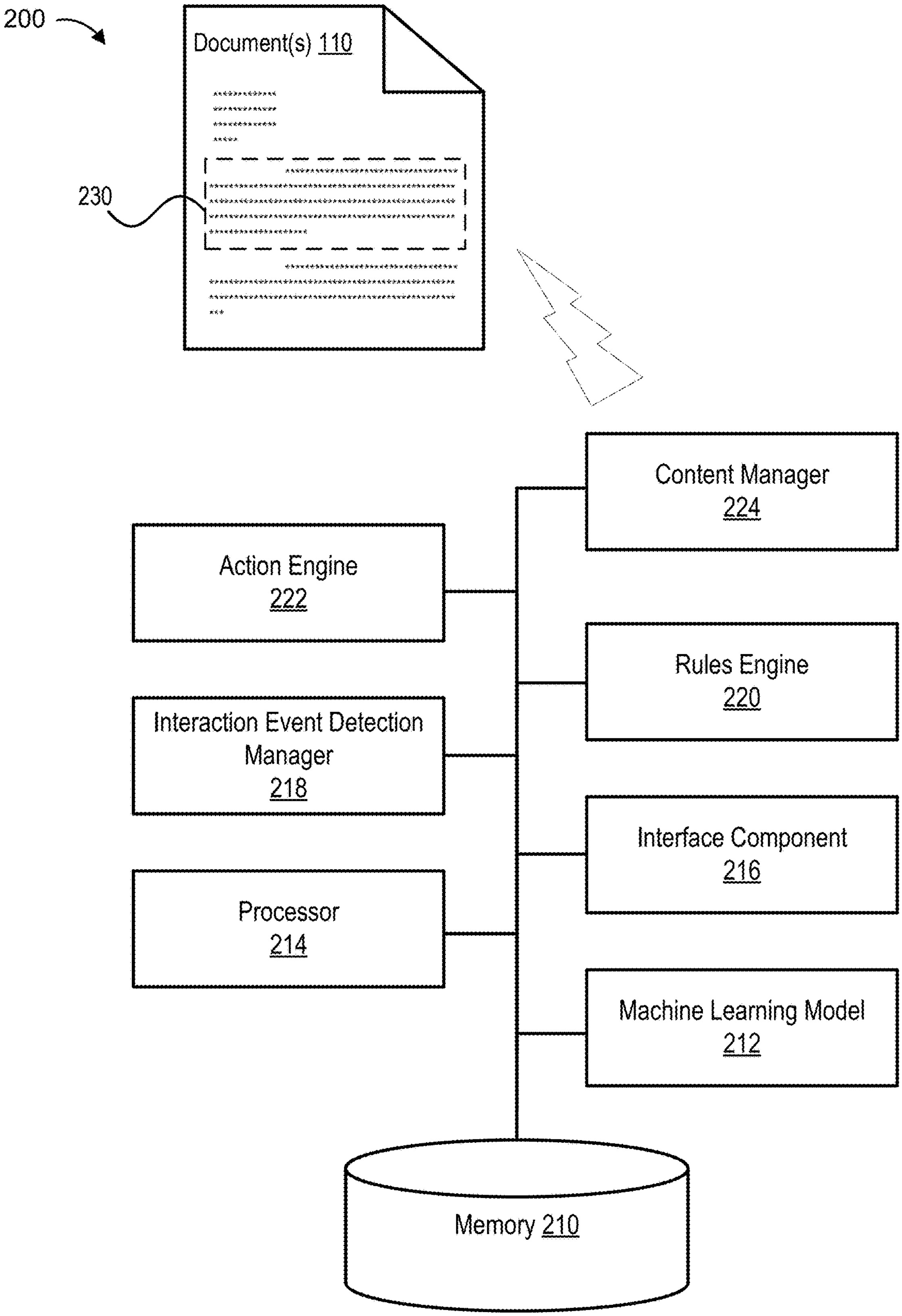
FIG. 2 is a block diagram illustrating an example system for adaptive multi-layer electronic content management, according to some aspects of the present disclosure.

FIG. 2 is a block diagram illustrating an example system 200 for adaptive multi-layer electronic content management, according to some aspects of the present disclosure. The system 200 can include at least one memory 210 that can store computer executable components and/or computer executable instructions. The system 200 can also include at least one processor 214 communicatively coupled to the at least one memory 210. The at least one processor 214 may facilitate execution of the computer executable components and/or the computer executable instructions stored in the at least one memory 210. The term "coupled" or variants thereof may include various communications including, but not limited to, direct communications, indirect communications, wired communications, and/or wireless communications.

Although the one or more computer executable components and/or computer executable instructions may be illustrated and described herein as components and/or instructions separate from the at least one memory 210 (e.g., operatively connected to the at least one memory 210), the various aspects are not limited to this implementation. Instead, in accordance with various implementations, the one or more computer executable components and/or the one more computer executable instructions may be stored in (or integrated within) the at least one memory 210. Further, while various components and/or instructions have been illustrated as separate components and/or as separate instructions, in some implementations, multiple components and/or multiple instructions may be implemented as a single component or as a single instruction. Further, a single component and/or a single instruction may be implemented as multiple components and/or as multiple instructions without departing from the example embodiments.

System 200 can also include machine learning model 212 configured to facilitate the adaptive multi-layer electronic content management. In some examples, system 200 can include more than one machine learning models (not shown). One example of such a machine learning model that can be implemented by system 200 is an LLM. An LLM is a deep learning algorithm that may recognize, summarize, translate, predict, and generate text and other content based on knowledge gained from being trained on massive training datasets. One popular LLM is GPT-4, which is a fourth generation of a Generative Pre-trained Transformer model produced by Open AI® of San Francisco, California. But any other suitable LLM may be used. The LLM can receive the interaction event and provide an adaptive response (e.g., an action corresponding to the rule and interaction event) as discussed below. The adaptive response provided as output can be kept in its original text format for display via a text interface or it may be converted into speech audio using a text-to-speech algorithm if being delivered via a voice interface. The adaptive response provided as output may also be in the form of image data or video data that may be displayed in an HTML web browser format. Interaction events received from a user may also be in the form of audio, which can be transcribed into text input via a speech-to-text algorithm.

In some examples, machine learning model 212 can be an LLM configured to determine an expertise level of a user of system 200. In this case, the LLM can be trained on a large corpus of text data for the specific application of analyzing user interaction events to determine an expertise level. Examples of such texts can include books, academic papers, legal publications, blog posts, social media posts, reviews, news articles, screenplays, statutes and regulations, website content, source code for software, and the like. These texts may be provided in one or more languages, such as English, Spanish, or Chinese. In some examples, the texts may also include image data or video data. In some examples, the image data or video data may be displayed using an HTML web browser for training by the LLM. The system 200 can execute a training process to train the LLM using the training data. To better tailor the LLM for the specific application of an adaptive multi-layer electronic content management, the LLM may undergo finetuning using task-specific training data, such as data associated with interaction events. After the additional finetuning, the LLM may be able to provide for specific applications for the adaptive multi-layer electronic content management such as analyzing the interaction event for contextual information about the user such as vocabulary used, grammar, sentence structure, and complexity of the input query to predict an expertise of the user. The LLM can then adaptively point to the user to the appropriate layer of document 110 in response.

Also included in the system 200 is interface component 216 that can be configured to provide an interface for a user of system 200. A user may upload a document into system 200 for interpretation and analysis by the adaptive multi-layer electronic content management. Interface component 216 can include a variety of different components configured to permit a user to interact with the system 200. For example, interface component 216 can include a keyboard, mouse, display screen, microphone, touchpad, and the like. Additionally, interface component 216 can include an interactive chatbot dialog window. A user can interact with the chatbot by asking the chatbot questions and instructing the chatbot to perform steps on the document in accordance with the adaptive multi-layer electronic content management. In some examples, the chatbot can utilize machine learning model 212 to interact and respond to user inputs.

The system 200 can also include an interaction event detection manager 218 configured to detect an interaction event received as input from a user through interface component 216. During interaction event detection by the interaction event detection manager 218, a section 230 of document 110 can be tagged to indicate that section 230 may be subject to the adaptive multi-layer electronic content management. Although discussed with respect to a section 230, the disclosed aspects may be utilized with more than one section. For example, during interaction with interface component 216, a user can indicate that a section of the document is of particular interest or inquiry. To select the section 230 of document 110, a user may manually select the portion of the document. For example, in a word processing document, the user may highlight a sentence or a paragraph. In a word processing spreadsheet example, the user may manually select one field or multiple fields, where the multiple fields represent a single portion. Other manners of selection may also be utilized by the user to indicate the sections.

Additionally or alternatively, a user can interact with the interface component 216 using voice commands to indicate that a section 230 of the document 110 is of particular interest or inquiry. In some examples, a microphone that is integrated with the interface component 216 can be configured to detect a voice command from a user. In this case, the user can identify a particular section of the electronic document by vocally instructing the system 200 to select a specific paragraph of the document, to analyze all the information contained within a specific heading of the document, to analyze specific cells within a spreadsheet, to analyze a specific image within a slide show presentation, and the like. One of ordinary skill in the art would recognize many suitable alternatives for using voice commands to instruct a system to work on a specific portion of a document.

The system 200 can also include a rules engine 220 for generating a rule based on the detection of an interaction event by the interaction event detection manager 218. In some examples, the rules engine 220 can be configured to obtain information related to an interaction event that causes an action to be performed by the action engine 222, discussed in more detail below, related to one or more identified sections of the document, such as section 230. In this way, the interaction event detection manager 218 and the rules engine 220 work in conjunction with each other to analyze the interaction event to determine an action to take. Additionally, the interaction event received by the interface component 216 can originate from an external source (not illustrated) (e.g., external to system 200 and/or the document 110) and/or from an internal source (not illustrated) (e.g., internal to the system 200 and/or the document).

According to one example, the rules engine can generate a rule in response to an interaction event received from an external source (e.g., external to system 200 and/or the document 110). In this example, the adaptive multi-layer electronic content management can layer a document based on timelines, as discussed above (e.g., the multi-layers of the document can correspond "most immediate/urgent" to "whenever you can get to it" timelines). Continuing with this example, a loan document that requires the loan to be repaid in full within ten years is provided and received by the system 200. When the loan is originally generated, the adaptive multi-layer electronic content management can generate layers formed above the base content layer corresponding to the various due dates and timelines in the loan document. For example, the due date for the monthly amount owed on the loan including interests and principal can be layered into the "urgent/immediate" layer. Additionally, the maturity of the loan (e.g., 10 years from the day the loan was executed) can be classified by the adaptive multi-layer electronic content management as "no immediate deadline." In this example, the maturity date of the loan can represent an interaction event from an external source (e.g., the defined calendar time/date of loan maturity). As the maturity date approaches, the adaptive multi-layer electronic content management can escalate the maturity date to a layer corresponding to "immediate/urgent." Thus, the rules engine can generate a rule such as "generate an alert to the debtor of the loan when the due date is approaching" based on the external source of the defined date and time.

Continuing on with the loan example from above, the rules engine can also generate a rule in response to an interaction event received from an internal source (e.g., internal to the system 200 and/or the document). For example, the adaptive multi-layer electronic content management can perform a layering of the document based on summarizing the loan agreement where the summaries provided in each layer are progressively simplified as additional layers are formed on top or above the base content layer. In this example, one section of the loan document can include a portion that contains information about what happens in the event that the debtor of the loan fails to make a monthly payment. Based on the interaction event, the adaptive multi-layer electronic content management can determine that the user of the adaptive multi-layer electronic content management has missed a monthly payment. Then, in response to this interaction event, the adaptive multi-layer electronic content management can point the user to the penalties portion of the document and the rules generation engine can generate a rule that instructs the adaptive multi-layer electronic content management to provide an explanation of the penalty for missing a monthly payment.

The system 200 can also include an action engine 222 that can be configured to dynamically implement one or more actions based on an occurrence of an interaction event detected by the interaction event detection manager 218 and based on the rule generated by the rules engine 220. The action engine 222 can instruct a content manager 224 to perform an action on all of document 110 or on a section 230 of the document 110. In this way, the content manager 224 can be configured to dynamically interact with document 110 to perform actions.

According to one specific example, machine learning model 212 may include two large language models to implement the adaptive multi-layer electronic content management. Both the LLMs could be trained on the corpus of text data mentioned above. The first LLM could be utilized for the specific application of determining an expertise level of a user interacting with the adaptive multi-layer electronic content management. The second LLM could be utilized for generating a summary of a document. In some examples, both applications could be performed by the same LLM.

Continuing with the above example, the first LLM of machine learning model 212 of system 200 can provide multiple summaries of a document, where the summaries vary in terms of complexity and comprehensiveness. Each summary that the first LLM generates may correspond to a layer formed of the document 110. The group of layers could be stored in a single container that maintains all the layers of the document. Thus, at this particular moment in the example, an electronic document has been received by the system 200 and the first LLM, trained on the corpus of text data, has generated multiple summaries of the document where each summary is organized in its own layer and each layer gets progressively simpler as the layers move away from the base content of the document.

Continuing on, the interface component 216 of system 200 receives an input from a user of system 200 or from another computing device or system (not shown). The input is passed to the interaction event detection manager 218 for analysis. The second LLM can be integrated into the interaction event detection manager 218 or formed as a separate component of system 200. The second LLM, which is trained on the large corpus of text data sets described above, can be configured to determine an expertise level of the user of the system 200 based on the interaction event. Thus, the second LLM can analyze the input received by the interface component 216 to determine an expertise level of the user. The expertise level can correspond to a variety of factors. For example, the expertise level can correspond to an education level such as pre-kindergarten, elementary school, middle school, high school, undergraduate, graduate, and post-graduate education level. The expertise level can also correspond to age or expertise level with the particular document ranging from novice or beginner to expert or advanced.

After the second LLM determines an expertise level of the user based on the interaction event detection manager 218 detecting an interaction event, the system 200 can generate a rule at the rule engine 220 that is executed by action engine 222 for implementation by content manager 224 on document 110. In one example, the second LLM can determine that the user is a beginner with respect to the specific type of document (e.g., a loan document, lease agreement, etc.) and that the user is exhibiting a high school level education. As a result, the system 200 can point the user (via rules engine 220) to the layer of the document 110 corresponding to this expertise level. Action engine 222 can capture the summary from the appropriate layer via the content manager 224 interacting with document 110 of the system 200 and display it to the user as an output. The output can be in the original text format that was generated by the first LLM or in the form of a voice output using a text-to-voice algorithm.

Accordingly, the system 200 interacting with document 110 or set of documents can be adaptive and self-aware and may act on interaction events in an automatic and efficient manner. This reduces the need for manual summarization, monitoring, interpretation, or other actions on the documents. Further, this increases efficiency, accessibility, and understanding of complex document as well as increased efficiency of a device on which system 200 is located (e.g., a computer or computing device) since the documents are updated and retained in an on-going basis. Thus, the information in a document is not stale and users are more likely to use the document, rather than another source of information (e.g., searching terms and explanations on the internet).

As previously mentioned, the interaction event can be a voice query received by a microphone that is part of the interface component 216. In the voice query, a user of system 200 can ask the system 200 to explain a section 230 of document 110. In this example, machine learning model 212 trained on a library of previous interaction events can determine an expertise level of the user asking the voice query. Interaction event detection manager 218 determines the occurrence of an interaction event (e.g., the voice query from a user instructing the system to explain a section of the document) and the rules engine, in response to the detection of the occurrence of an interaction event, generates a rule to take on the section 230 of the document 110. In this example, the rule generated by the rules engine 220 can be a summarization rule. Then, action engine 222, based on the generated rule and the detection of an interaction event, instructs the content manager 224 to perform the action on the document 110.

In some examples, an interaction event detected by the interaction event detection manager 218 may cause implementation of more than one rule on more than one section of the document. According to another particular example, a document is provided and users of the system 200 can be a child and a grandparent. In this example, the document can be in the English language and the grandparent can be from a foreign country where English is not the native language. Furthermore, the child involved in this example can be a child born in an English-speaking country and attending elementary school. Thus, the child has an elementary school level understanding of English. The document provided can be a mortgage agreement that the grandparent is interested in reviewing because the grandparent seeks to buy a home and move to the country where the child resides. Since the grandparent has no understanding of English, the child can utilize system 200 to provide assistance.

Staying with this example, the action engine 222 of the adaptive multi-layer electronic content management can execute one or more rules generated by the rules engine 220 and based on the interaction event. One example of an interaction event for this scenario could be the child interacting with system 200 to determine the essential elements of the mortgage agreement. As discussed previously, the system 200 could utilize a machine learning model 212 trained on previous interaction events to determine an expertise level of the user, and in this case, the system 200 could determine that the child is of elementary education level and thus, point the child to the most basic layer of document 110 which contains the most simplified explanation of the key terms of the mortgage agreement. Additionally, since the information is being provided for the benefit of the grandparent who does not speak English, the rules engine 220 could generate an additional rule that causes the action engine 222 to translate the summary of the key elements into the native language of the grandparent. Then, the child could relay the information to the grandparent. This sequence of events could continue for however long the grandparent needs in order to gain a full understanding of the document.

Figure 3:
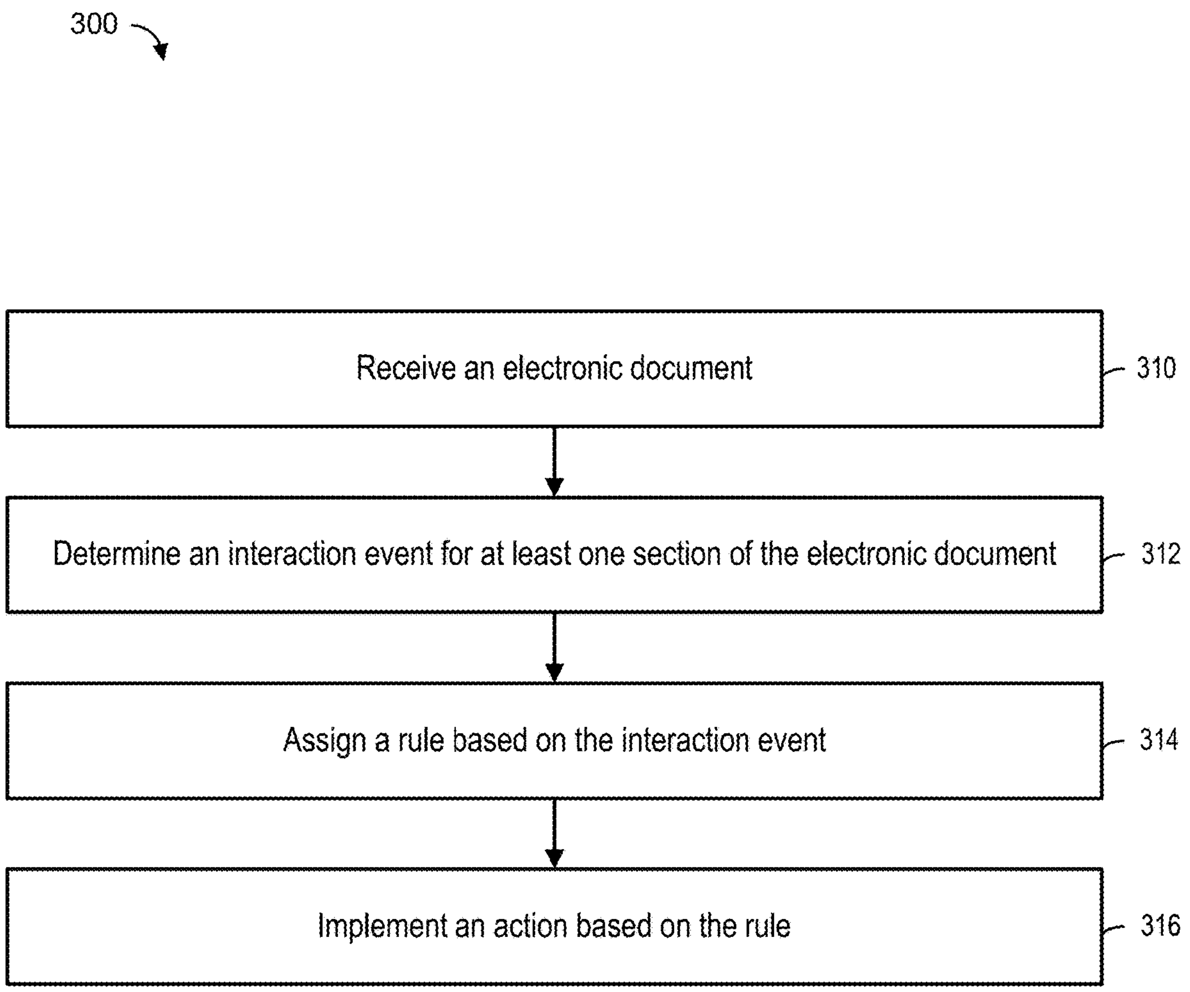
FIG. 3 is a flowchart of an example of a process for adaptive multi-layer electronic content management, according to some aspects of the present disclosure.

FIG. 3 is a flowchart of an example of a process 300 for adaptive multi-layer electronic content management, according to some aspects of the present disclosure. In some examples, such as examples described in relation to FIG. 1-2, a computing system implements operations described by FIG. 3, by executing suitable program code. In some examples, such as described in relation to FIG. 1-2, the computing system is in communication with a user device or other form of user interaction (e.g., voice commands). For illustrative purposes, the process 300 is described with reference to the examples depicted in FIG. 1-2. Other implementations, however, are possible.

At block 310, the process 300 involves receiving an electronic document. As previously discussed herein, although the term "document" or "electronic document" is utilized, for purposes of simplicity, the term "document" may refer to any type of electronic media content that may be utilized in electronic formal and/or in print format. Likewise, the term "electronic media content" as used herein can refer to any form of data such as text data, image data, or video data. Furthermore, although the various aspects are discussed with respect to a single document, such as document 110 discussed above in relation to FIG. 1-2, the various aspects may be utilized with more than one document or set of documents. The document can be received at block 310 in multiple different ways. For example, a user can upload the document directly. Additionally, a user can access the document via an account made with the enterprise responsible for generating the document. In other words, if the document corresponds to a loan agreement with a financial institution, then the user could create an online account with the financial institution and access the document or set of documents through their online portal such that block 310 receives the document directly from the online portal. Moreover, the document can be received via email or other means of electronic transfer or accessed (e.g., scanned) from an HTML web browser page.

At block 312, the process 300 involves determining an interaction event for at least one section of the electronic document. The interaction event involves a user interacting with the electronic document via voice or text commands. In some examples, the interaction event can involve a user selecting a portion or section of the document. Additionally, the interaction event could involve a user asking questions about the document such as the key timeline information, the most important information, or summary of complex issues within the document. A more complete and comprehensive discussion of the various forms of interaction events are detailed above in relation to FIG. 2.

At block 314, the process 300 involves assigning a rule based on the interaction event. The rule can be assigned to the electronic document, or a section of the electronic document based on the interaction event. Additionally or alternatively, multiple rules can be assigned to a single section, or one or more subsections of the document, where a subsection is a portion of a section. For example, a first rule may apply to the section of a second rule may apply to a subsection. In one example, a rule could be a summarization rule. In another example, the rule could be a display rule to display requested information from a section of the document. In yet another example, the rule can be a combination of a summarization rule and a display rule. In yet another example, the rule can be a translation rule to translate the information in the document to a different language. In yet another example, the rule can be a rule to point a user to all portions of the electronic document that require a signature. One of ordinary skill in the art would recognize many suitable alternatives.

Additionally, the rule that is assigned based on the interaction event can correspond with a pointer that identifies and surfaces the appropriate layer of the electronic document. As discussed herein, the describe adaptive multi-layer electronic content management can organize a document into multiple layers depending on and corresponding to the interaction event. Based on the interaction event and assigned rule, the pointer can identify and surface (e.g., display) to the user the appropriate layer of the document.

Moreover, the rules may be expressed in various formats including, for example, "if/then" statements. One non-limiting example of an if/then statement may include: "if an explanation of a section of the document is requested, as determined by the interaction event, then summarize the document and display the summary corresponding to the user's expertise level." Based on detection of the occurrence of the "if" portion of the statement, the rules engine may be configured to automatically (or dynamically) implement the "then" portion of the rule.

At block 316, the process 300 involves implementing an action based on the rule. Based on the detection of an interaction event and the corresponding rule, one or more actions can be implemented on the electronic document. In one example, the interaction event can correspond to a user requesting a simplified explanation of a section of an electronic document. In response to this interaction event, the rules engine could assign a summarization rule to the interaction event. Then the action engine could implement the summarization rule based on the interaction event to the section of the electronic document selected by the user. In another example, the electronic document could be organized into multiple layers. The multiple layers could correspond to summaries of the electronic document or sections of the documents where the layers vary in terms of complexity. Then, the summary that is displayed to a user could correspond to the user's expertise level. As described previously, the expertise level and the multiple generated layers can be determined and generated by a machine learning model (e.g., machine learning model 212 from FIG. 2), such as an LLM. Additionally, the LLM can be fine-tuned for the specific application of the adaptive multi-layer electronic content management and trained based on a library of previous interaction events.

Accordingly, documents may be management adaptively and dynamically based on interaction events and rules associated with the interaction events. In this manner, efficiencies related to electronic content management of documents may be realized and the need for manual content management may be mitigated.

Figure 4:
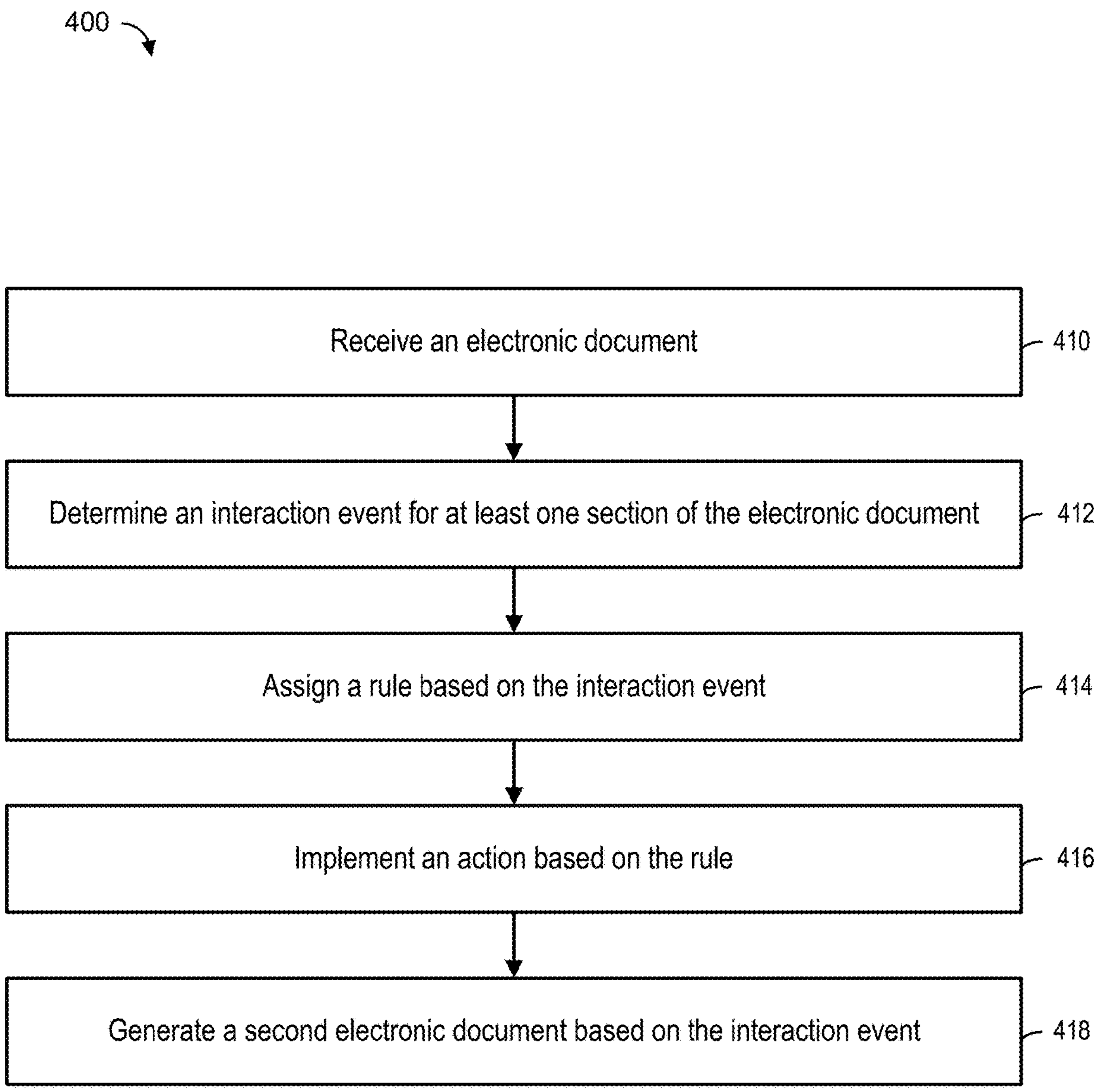
FIG. 4 is a flowchart of an example of a process for adaptive multi-layer electronic content management, according to some aspects of the present disclosure.

FIG. 4 is a flowchart of an example of a process 400 for adaptive multi-layer electronic content management, according to some aspects of the present disclosure. In some examples, such as examples described in relation to FIG. 1-2, a computing system implements operations described by FIG. 4, by executing suitable program code. In some examples, such as described in relation to FIG. 1-2, the computing system is in communication with a user device or other form of user interaction (e.g., voice commands). For illustrative purposes, the process 400 is described with reference to the examples depicted in FIG. 1-2. Other implementations, however, are possible.

Additionally, process 400 is similar to process 300 described above in relation to FIG. 3. Similar to process 300, at block 410, process 400 involves receiving an electronic document. At block 412, process 400 involves determining an interaction event for at least one section of the electronic document. At block 414, process 400 involves assigning a rule based on the interaction event. At block 416, process 400 involves implementing an action based on the rule. To avoid repetitive explanation, and according to some examples, block 410, block 412, block 414, and block 416 can share the same description as block 310, block 312, block 314, and block 316, respectively.

Process 400 departs from the previous process at block 418, where process 400 involves the additional step of generating a second electronic document based on the interaction event. As described previously, based on the needs of a user interacting with the adaptive multi-layer electronic content management, a need for additional documents can arise based on the specific scenario and context. As such, at block 418, the process 400 can predictively generate the required additional documents based on an inference of the user's needs and the context of the interaction event. In some examples, this inference can be determined based on the progression of user questions and inputs (e.g., progression of interaction events). In other examples, the interaction event itself can correspond to a user requesting the generation of additional documents.

In one example, the second electronic document can be generated by a machine learning model, such as an LLM trained on a large corpus of text data, as discussed herein, and be specifically tailored (e.g., finetuned) to analyze interaction events to predict whether a user may need a document in the future. Through the course of a user interacting with the adaptive multi-layer electronic content management, the user can provide multiple input queries (e.g., multiple interaction events). With each interaction event received, the LLM can analyze the input query and provide a response. Additionally, the LLM can analyze the series of interaction events to predict the future needs of the user by generating additional documents are suggesting other queries and responses that the user may find helpful. In this way, the process 400, and other examples described herein, are adaptive and in that they dynamically adapt to, adjust for, and predict the needs of the user to ensure efficient interaction and ease of access of information.

Figure 5:
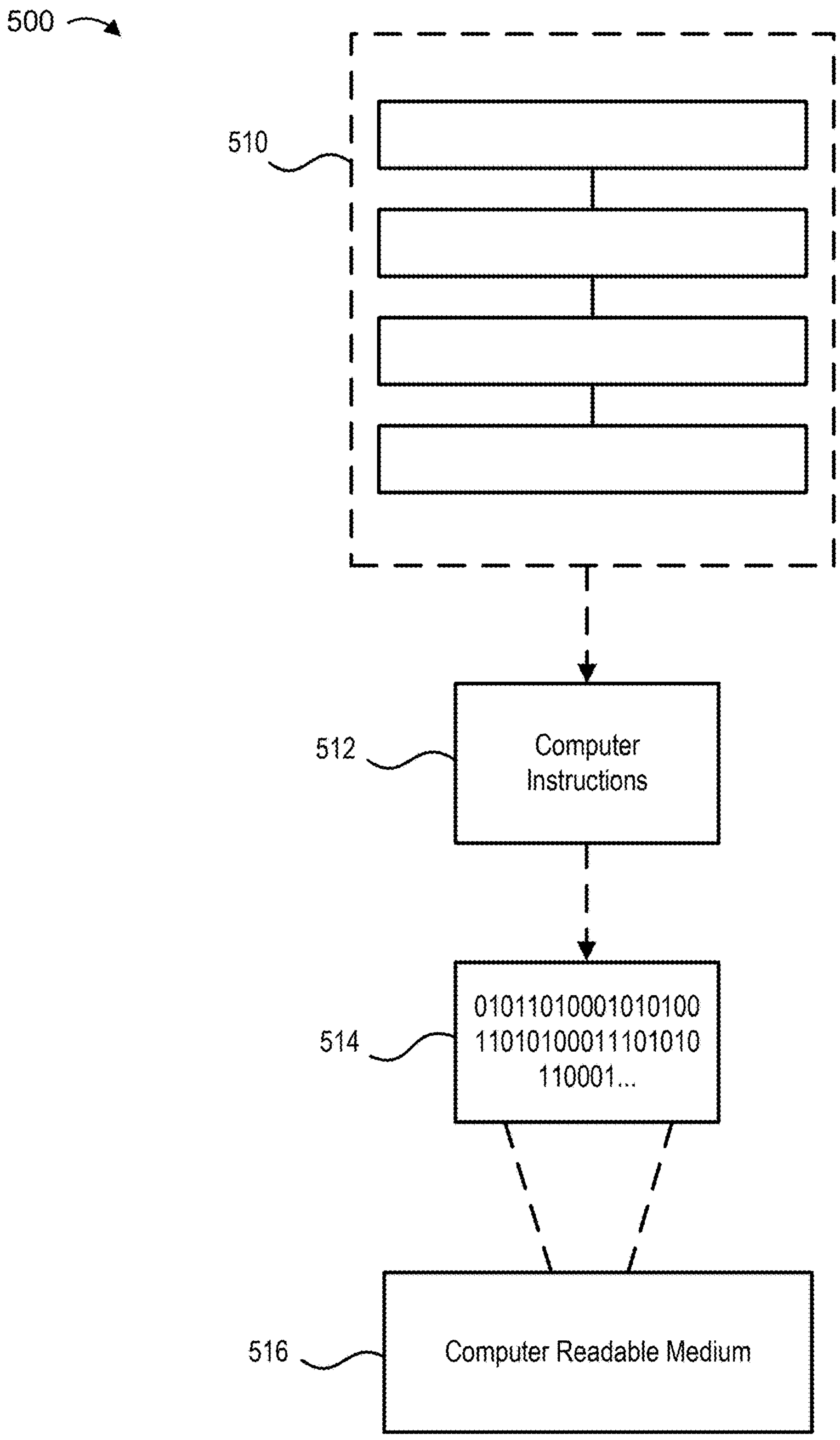
FIG. 5 is a block diagram illustrating an example computer-readable medium or computer-readable device including processor-executable instructions configured to embody one or more of the aspects set forth herein.

One or more of the aspects of the present disclosure include a computer-readable medium including microprocessor or processor-executable instructions configured to implement one or more embodiments presented herein. As discussed herein the various aspects utilize LLMs to provide systems and methods for adaptive multi-layer electronic content management. FIG. 5 is a block diagram illustrating an example computer-readable medium or computer-readable device including processor-executable instructions configured to embody one or more of the aspects set forth herein. As illustrated in FIG. 5, implementation 500 a computer-readable medium 516 is provided. Computer-readable medium can include a CD-R, DVD-R, flash drive, a platter of a hard disk drive, and so forth, on which computer-readable data 514 is encoded and stored. The computer-readable data 514, such as binary data including a plurality of zero's and one's as illustrated, in turn includes a set of computer instructions 512 configured to operate according to one or more of the principles set forth herein.

In the illustrated implementation 500 of FIG. 5, the set of computer instructions 512 (e.g., processor-executable computer instructions) may be configured to perform a method 510, such as the process 300 of FIG. 3 and/or process 400 of FIG. 4, for example. In another embodiment, the set of computer instructions 512 may be configured to implement a system, such as the system 200 of FIG. 2, for example. Many such computer-readable media may be devised by those of ordinary skill in the art that are configured to operate in accordance with the techniques presented herein.

As used in this application, the terms "component," "module," "system," "interface," "manager," and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller may be a component. One or more components residing within a process or thread of execution and a component may be localized on one computer or distributed between two or more computers.

A device may also be called, and may contain some or all of the functionality of a system, subscriber unit, subscriber station, mobile station, mobile, mobile device, wireless terminal, device, remote station, remote terminal, access terminal, user terminal, terminal, wireless communication device, wireless communication apparatus, user agent, user device, or user equipment (UE). A mobile device may be a cellular telephone, a cordless telephone, a Session Initiation Protocol (SIP) phone, a smart phone, a feature phone, a wireless local loop (WALL) station, a personal digital assistant (PDA), a laptop, a handheld communication device, a handheld computing device, a netbook, a tablet, a satellite radio, a data card, a wireless modem card, and/or another processing device for communicating over a wireless system. Further, although discussed with respect to wireless devices, the disclosed aspects may also be implemented with wired devices, or with both wired and wireless devices.

Further, the claimed subject matter may be implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

FIG. 5 and the following discussion provide a description of a suitable computing environment to implement embodiments of one or more of the aspects set forth herein. The operating environment of FIG. 5 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, embodiments are described in the general context of "computer readable instructions" being executed by one or more computing devices. Computer readable instructions may be distributed via computer readable media as will be discussed below. Computer readable instructions may be implemented as program modules, such as functions, objects, application programming interfaces (APIs), data structures, and the like, which perform one or more tasks or implement one or more abstract data types. Typically, the functionality of the computer readable instructions is combined or distributed as desired in various environments.

Figure 6:
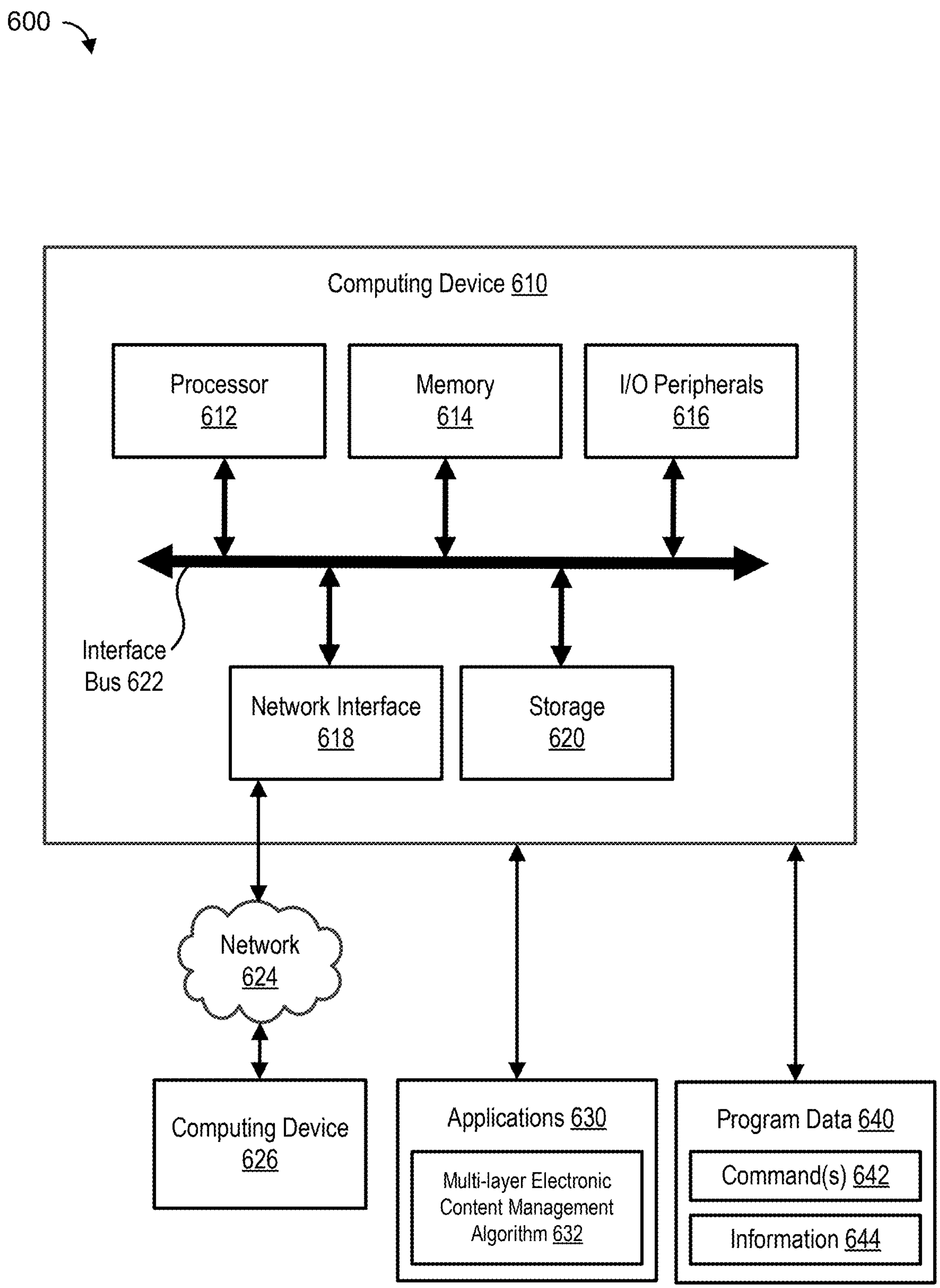
FIG. 6 is a block diagram illustrating an example computing environment where one or more of the aspects set forth herein are implemented, according to some aspects of the present disclosure.

FIG. 6 is a block diagram illustrating an example computing environment 600 that provides adaptive multi-layer electronic content management, according to some aspects of the present disclosure. In one configuration, the computing device 610 may include at least one processor 612 and at least one memory 614. Depending on the exact configuration and type of computing device, the at least one memory 614 may be volatile, such as RAM, non-volatile, such as ROM, flash memory, etc., or a combination thereof. Examples of processor 612 include a microprocessor, an application-specific integrated circuit (ASIC), a field-programmable gate array (FPGA), or any other suitable processing device. Computing device 610 can include one processor, such as is illustrated by processor 612 in FIG. 6, or more than one processor.

Computing device 610 may include additional features or functionality. For example, the computing device 610 may include additional storage such as removable storage or non-removable storage, including, but not limited to, magnetic storage, optical storage, etc. Such additional storage is illustrated in FIG. 6 by storage 620. In one or more embodiments, computer readable instructions to implement one or more embodiments provided herein are in the storage 620. The storage 620 may store other computer readable instructions to implement an operating system, an application program, etc. Computer readable instructions may be loaded in the at least one memory 614 for execution by the at least one processor 612, for example.

Computing devices may include a variety of media, which may include computer-readable storage media or communications media, which two terms are used herein differently from one another as indicated below.

Computer-readable storage media may be any available storage media, which may be accessed by the computer and includes both volatile and nonvolatile media, removable and non-removable media. By way of example, and not limitation, computer-readable storage media may be implemented in connection with any method or technology for storage of information such as computer-readable instructions, program modules, structured data, or unstructured data. Computer-readable storage media may include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which may be used to store desired information. Computer-readable storage media may be accessed by one or more local or remote computing devices (e.g., via access requests, queries, or other data retrieval protocols) for a variety of operations with respect to the information stored by the medium.

Communications media typically embody computer-readable instructions, data structures, program modules, or other structured or unstructured data in a data signal such as a modulated data signal (e.g., a carrier wave or other transport mechanism) and includes any information delivery or transport media. The term "modulated data signal" (or signals) refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

Still referring to FIG. 6, the computing environment 600 may also include a number of additional external or internal devices, for example, input or output devices. For example, computing device 610 is illustrated as including input/output (I/O) peripherals 616. I/O peripherals 616 can receive input from input device or provide output to output devices (not shown). Input peripherals can include a variety of different input devices such as keyboards, mouses, pens, voice input devices, touch input devices, infrared cameras, video input devices, or any other input device. Output peripherals can include a variety of different output devices such as one or more displays, speakers, printers, or any other output device may be included with the computing device 610. I/O peripherals 616 may be connected to the computing device 610 via a wired connection, wireless connection, or any combination thereof. In one or more embodiments, an additional computing device, such as computing device 626 can be connected to computing device 610 via network 624 and be used as the input and output device for the computing device 610. Further, the computing device 610 may include network interface 618 to facilitate communications with one or more other devices, illustrated as a computing device 626 coupled over a network 624. Network interface 618 can include any device or group of devices suitable for establishing a wired or wireless data connection to one or more data networks. Non-limiting examples of the network interface 618 include an Ethernet network adaptor, a wireless network adapter, and the like.

Interface bus 622 is also included in computing device 610. Although only one interface bus is illustrated, computing environment 600 can include more than one interface bus. Interface bus 622 can communicatively couple one or more components of computing device 610.

Staying with FIG. 6, computer environment 600 includes one or more applications 630 and/or program data 640 that may be accessible by the computing device 610. According to some implementations, the applications 630 and/or program data 640 are included, at least in part, in the computing device 610. The applications 630 may include an adaptive multi-layer electronic content management algorithm 632 that is arranged to perform the functions as described herein including those described with respect to the system 200 of FIG. 2, the process 300 of FIG. 3, and/or the process 400 of FIG. 4. The program data 640 may include adaptive multi-layer electronic content management commands 642 and adaptive multi-layer electronic content management information 644 that may be useful for operation with the various aspects as described herein.

Numerous specific details are set forth herein to provide a thorough understanding of the claimed subject matter. However, those skilled in the art will understand that the claimed subject matter may be practiced without these specific details. In other instances, methods, apparatuses, or computing systems that would be known by one of ordinary skill have not been described in detail so as not to obscure claimed subject matter.

Unless specifically stated otherwise, it is appreciated that throughout this specification discussions utilizing terms such as "generating," "processing," "computing," and "determining" or the like refer to actions or processes of a computing device, such as one or more computers or a similar electronic computing device or devices that manipulate or transform data represented as physical electronic or magnetic quantities within memories, registers, or other information storage devices, transmission devices, or display devices of the computing platform.

The computing system or computing systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general-purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or." Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes," "having," "has," "with," or variants thereof are used in either the detailed description or the claims, such terms are intended to be inclusive in a manner similar to the term "comprising." The use of "configured to" or "based on" herein is meant as open and inclusive language that does not foreclose devices adapted to or configured to perform additional tasks or steps. The endpoints of comparative limits are intended to encompass the notion of quality. Thus, expressions such as "more than" should be interpreted to mean "more than or equal to."

Where devices, computing systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation and does not preclude inclusion of such modifications, variations, and/or additions to the present subject matter as would be readily apparent to one of ordinary skill in the art.

What is claimed is:

1. A system, comprising:

a processor coupled to a memory that includes instructions that, when executed by the processor, cause the processor to:

receive an electronic document;

generate a plurality of layers associated with the electronic document, wherein each layer comprises a representation of the electronic document at a different complexity level;

determine an interaction event associated with the electronic document;

determine an expertise level of a user of the electronic document responsive to determining the interaction event;

assign a rule to the electronic document corresponding to a pointer that identifies at least one layer of the plurality of layers based on the interaction event and the expertise level of the user; and implement an action to the electronic document based on a determination that the interaction event has occurred and the rule, the action involving at least causing a presentation of the at least one layer of the plurality of layers.

2. The system of claim 1 wherein the plurality of layers includes a base content layer that contains the electronic document and a first layer that contains information corresponding to the base content layer, wherein the information contained in the first layer is generated by a machine learning model.

3. The system of claim 2 wherein the plurality of layers includes a second layer that contains information corresponding to the first layer, wherein the information contained in the second layer is generated by the machine learning model.

4. The system of claim 2, wherein the machine learning model is trained on a library of previous interaction events and is configured to determine the expertise level of the user based on the interaction event.

5. The system of claim 1, wherein a machine learning model determines the action to be taken on the electronic document based on the expertise level of the user.

6. The system of claim 1, wherein the at least one layer of the plurality of layers comprises a summary of the electronic document, wherein a complexity of the summary corresponds to the expertise level of a user of the system.

7. The system of claim 1, wherein the interaction event comprises at least one of a text input or a voice input.

8. The system of claim 1, wherein the instructions further cause the processor to generate a second electronic document based on the interaction event.

9. The system of claim 8, wherein the second electronic document is generated by a machine learning model configured to predict a need for the second electronic document based on the interaction event.

10. A method comprising:

receiving an electronic document;

generating a plurality of layers associated with the electronic document, wherein each layer comprises a representation of the electronic document at a different complexity level;

determining an interaction event associated with the electronic document;

determining an expertise level of a user of the electronic document responsive to determining the interaction event;

assigning a rule to the electronic document corresponding to a pointer that identifies at least one layer of the plurality of layers based on the interaction event and the expertise level of the user; and implementing an action to the electronic document based on a determination that the interaction event has occurred and the rule, the action involving at least causing a presentation of the at least one layer of the plurality of layers.

11. The method of claim 10 wherein the plurality of layers includes a base content layer that contains the electronic document and a first layer that contains information corresponding to the base content layer, wherein the information contained in the first layer is generated by a machine learning model.

12. The method of claim 11 wherein the plurality of layers includes a second layer that contains information corresponding to the first layer, wherein the information contained in the second layer is generated by the machine learning model.

13. The method of claim 11, wherein the machine learning model is trained on a library of previous interaction events and is configured to determine the expertise level of the user based on the interaction event.

14. The method of claim 10, wherein a machine learning model determines the action to be taken on the electronic document based on the expertise level of the user.

15. The method of claim 10, wherein the at least one layer of the plurality of layers comprises a summary of the electronic document, wherein a complexity of the summary corresponds to the expertise level of a user.

16. The method of claim 10, wherein the interaction event comprises at least one of a text input or a voice input.

17. The method of claim 10, further comprising:

generating a second electronic document based on the interaction event, wherein the second electronic document is generated by a machine learning model configured to predict a need for the second electronic document based on the interaction event.

18. A non-transitory computer-readable medium embodying program code that, when executed by one or more processors, causes the processors to perform operations comprising:

receiving an electronic document;

generating a plurality of layers associated with the electronic document, wherein each layer comprises a representation of the electronic document at a different complexity level;

determining an interaction event associated with the electronic document;

determining an expertise level of a user of the electronic document responsive to determining the interaction event;

assigning a rule to the electronic document corresponding to a pointer that identifies at least one layer of the plurality of layers based on the interaction event and the expertise level of the user; and implementing an action to the electronic document based on a determination that the interaction event has occurred and the rule, the action involving at least causing a presentation of the at least one layer of the plurality of layers.

* * * * *